No. 738,282. PATENTED SEPT. 8, 1903.
P. BENDIXEN.
MECHANICAL MOVEMENT.
APPLICATION FILED DEC. 15, 1902.
NO MODEL.
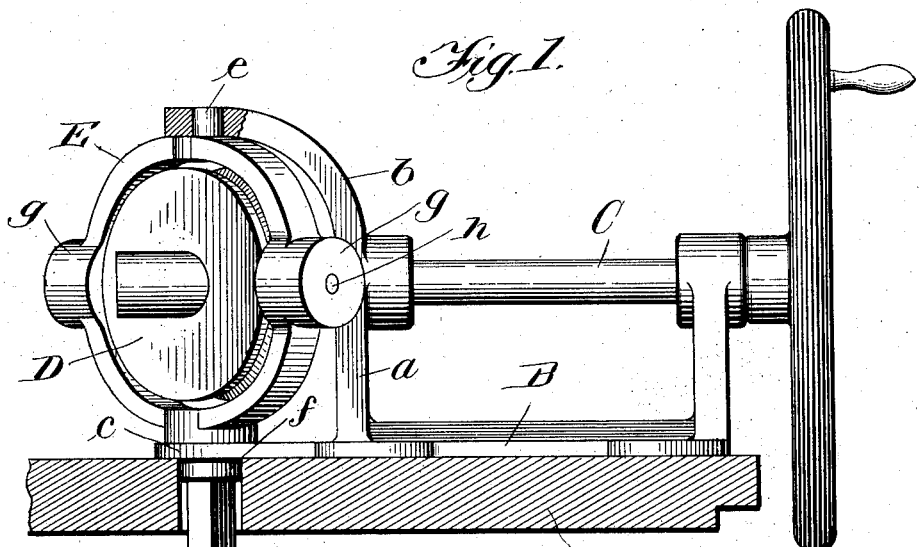
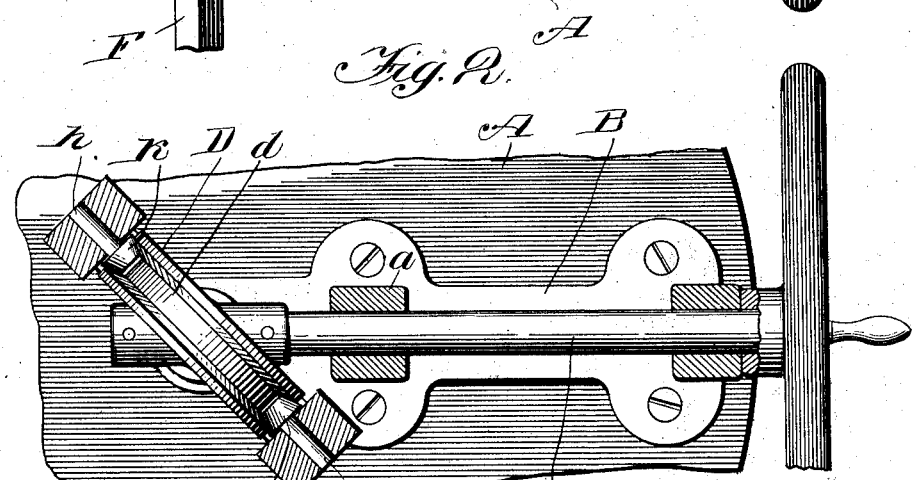
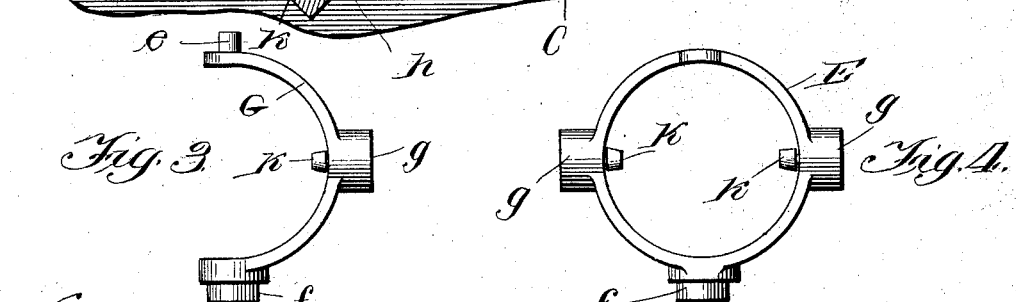
Witnesses:
H. S. Gaither
E. K. Lundy
Inventor:
Peter Bendixen
by Frank D. Thomason
Attorney No. 738,282.

Patented September 8, 1903.

UNITED STATES PATENT OFFICE.

PETER BENDIXEN, OF DAVENPORT, IOWA.

MECHANICAL MOVEMENT.

SPECIFICATION forming part of Letters Patent No. 738,282, dated September 8, 1903.

Application filed December 15, 1902. Serial No. 135,298. (No model.)

*To all whom it may concern:*

Be it known that I, PETER BENDIXEN, a citizen of the United States, and a resident of Davenport, in the county of Scott and State of Iowa, have invented certain new and useful Improvements in Mechanical Movements, of which the following is a full, clear, and exact description.

My improvements relate to mechanical movements which are particularly applicable to washing-machines, churns, &c., although capable of use in connection with other mechanism.

The object of my invention is to provide a simple, cheap, and efficient mechanical movement for converting a continuous rotary movement into a rotary reciprocal movement in which the points of engagement of the intermediate converting device are located in each side of the shaft diametrically opposite each other, so as to distribute the strain and reduce the friction which would otherwise result. This I accomplish by the means hereinafter fully described and as particularly pointed out in the claims.

In the drawings, Figure 1 is a side elevation of my invention. Fig. 2 is a plan view of the same. Fig. 3 is a side elevation, on a reduced scale, of a modified form of the intermediate converting member of my invention. Fig. 4 is a similar view of the preferred form of intermediate converting member.

In the drawings, A represents a suitable support for the supporting-frame B of my invention, which comprises a suitable screw-plate and two bearing-posts, the one $a$ farthest from the edge of support A having a gooseneck extension $b$ above the bearings therein.

Journaled in the bearing-posts of frame B is the drive-shaft C, on the outer extended end of which a hand-wheel is secured by means of which it can be turned continuously in one direction or the other. The opposite end of shaft C extends beyond its bearings in post $a$ and has secured thereto an obliquely-arranged wheel D, the circumference of which is concaved or provided with a groove $d$.

In the end of the gooseneck $b$ and in the portion $c$ of the screw-plate of frame B, extending beyond post $a$, are vertically-alining bearings for the pivotal studs $e$ and $f$ of the circular yoke E. This yoke is greater in diameter than wheel D and surrounds the same, and an imaginary straight line connecting the centers of its upper and lower pivotal studs will intersect the center of rotation of wheel D. At points diametrically opposite each other and located, preferably, in the horizontal plane intersecting the axis of shaft C the yoke is provided with bosses $g$ $g$, which have radially-extending bearings therethrough for the cylindrical shanks or journals $h$ $h$ of the friction-rollers $k$ $k$. These friction-rollers are integral with the inner ends of said journals $h$ and project into the groove $d$ of wheel D diametrically opposite each other, and in order to facilitate and reduce the friction between these rollers $k$ $k$ and said wheel I prefer to taper said rollers and to bevel the side walls of said groove $d$ at an angle corresponding to that of the tapered sides of said rollers.

In operation the revolving of shaft C continuously in one direction causes the yoke E to oscillate back and forth on its vertical axis, and this motion it imparts to the vertical shaft F, the upper end of which extends up through a suitable opening in support A in alinement with the axis of said yoke, the lower stud $f$ of which is considerably greater than the upper stud of said yoke, and is provided with a suitable opening into which the upper squared extremity of said shaft F snugly fits.

In Fig. 3 I show a modified form of yoke G, which is similar to yoke E in every respect if one side of the same be cut away between the pivotal studs thereof. In case of yoke G being used, however, shaft C is subjected to a torsional strain. The effort required to reverse the movement of this yoke is rendered harder and the strain on the friction-roller is made just twice as great as when yoke E is used, so I much prefer the use of the latter.

When the yoke is so constructed as to derive motion from the oblique disk by contact therewith at points diametrically opposite each other, the superstructure of said yoke above the points of engagement with the disk and the gooseneck of the supporting-frame may be dispensed with. In this latter event the yoke would be connected to and by the upper end of the rotary reciprocal shaft and it would be immaterial whether the circumferential sides of its boss were journaled in bearings in the extension of the base-plate of the supporting-frame or the upper end of said shaft were journaled in said bearing.

What I claim as new, and desire to secure by Letters Patent, is—

1. A mechanical movement comprising a continuously-revolving shaft, an oblique disk thereon having a circumferential groove in its periphery, a yoke which is pivoted so that its axis intersects the center of said disk, a friction-roller journaled in said yoke intermediate its pivots the axis of which is in radial alinement with said disk the groove in which it engages, a common supporting-frame for said revolving shaft and said yoke having an upwardly-extending gooseneck-bracket and a suitable horizontally-disposed bracket at its lower end, and a rotary reciprocal shaft in alinement with and actuated by said yoke.

2. A mechanical movement comprising a continuously-revolving shaft, an oblique disk thereon having a circumferential groove in its periphery, a circular yoke pivoted at its top and bottom so that its axis intersects the center of said disk, friction-rollers journaled diametrically opposite each other in said yoke intermediate its bearings the axes of which are in radial alinement with the center of said disk the groove in which they engage, a common supporting-frame for said revolving shaft and said yoke having an upwardly-extending gooseneck-bracket and a suitable horizontally-disposed bracket connected to said yoke in alinement with its pivots and actuated thereby.

In testimony whereof I have hereunto set my hand this 5th day of December, 1902.

PETER BENDIXEN.

Witnesses:
J. H. BENDIXEN,
HENRY MUMM.